United States Patent
Talathi et al.

(10) Patent No.: US 10,332,028 B2
(45) Date of Patent: Jun. 25, 2019

(54) METHOD FOR IMPROVING PERFORMANCE OF A TRAINED MACHINE LEARNING MODEL

(71) Applicant: QUALCOMM Incorporated, San Diego, CA (US)

(72) Inventors: Sachin Subhash Talathi, San Diego, CA (US); Aniket Vartak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 463 days.

(21) Appl. No.: 14/863,410

(22) Filed: Sep. 23, 2015

(65) Prior Publication Data

US 2017/0061326 A1    Mar. 2, 2017

Related U.S. Application Data

(60) Provisional application No. 62/209,859, filed on Aug. 25, 2015.

(51) Int. Cl.

| | |
|---|---|
| *G06N 3/02* | (2006.01) |
| *G06N 20/00* | (2019.01) |
| *G06N 3/08* | (2006.01) |
| *G06K 9/62* | (2006.01) |
| *G06K 9/46* | (2006.01) |
| *G06N 3/04* | (2006.01) |

(52) U.S. Cl.
CPC ........... *G06N 20/00* (2019.01); *G06K 9/4628* (2013.01); *G06K 9/627* (2013.01); *G06K 9/6257* (2013.01); *G06K 9/6267* (2013.01); *G06N 3/082* (2013.01); *G06N 3/02* (2013.01); *G06N 3/04* (2013.01)

(58) Field of Classification Search
None
See application file for complete search history.

(56) References Cited

U.S. PATENT DOCUMENTS

| | | |
|---|---|---|
| 7,233,843 B2 | 6/2007 | Budhraja et al. |
| 8,060,259 B2 | 11/2011 | Budhraja et al. |
| 8,315,465 B1 | 11/2012 | Baluja et al. |
| 8,401,710 B2 | 3/2013 | Budhraja et al. |
| 8,438,009 B2 | 5/2013 | Amini et al. |
| 8,554,701 B1 | 10/2013 | Dillard et al. |
| 9,060,685 B2 | 6/2015 | Cosatto et al. |
| 2009/0157572 A1 | 6/2009 | Chidlovskii |

(Continued)

FOREIGN PATENT DOCUMENTS

WO    2005022343 A2    3/2005

OTHER PUBLICATIONS

Martin, et al., Hyperspectral Hybrid Method Classification for Detecting Altered Mucosa of the Human Larynx, International Journal of Health Geographics 2012, 11:21, pp. 1-9 (Year: 2012).*

(Continued)

*Primary Examiner* — Wilbert L Starks
(74) *Attorney, Agent, or Firm* — Seyfarth Shaw LLP

(57) ABSTRACT

A method for improving performance of a trained machine learning model includes adding a second classifier with a second objective function to a first classifier with a first objective function. Rather than minimizing a function of errors for the first classifier, the second objective function is used to directly reduce the number errors of the first classifier.

28 Claims, 10 Drawing Sheets

(56) References Cited

U.S. PATENT DOCUMENTS

2014/0279746 A1   9/2014   De Bruin et al.

OTHER PUBLICATIONS

Saifullah, et al., Near Optimal Rate Selection for Wireless Control Systems, ACM Trans. Embedd. Comput. Syst. 13, 4s, Article 128 (Mar. 2014), pp. 1-25 (Year: 2014).*
Krizhevsky, et al., ImageNet Classification with Deep Convolutional Neural Networks, Proceedings of the 25th International Conference on Neural Information Processing Systems, 2012, pp. 1097-1105 (Year: 2012).*
Hinton G., et al., "Distilling the Knowledge in a Neural Network", NIPS 2014, Mar. 9, 2015, pp. 1-9.
Press W.H., et al., "Numerical Recipes in C: Art of Scientific Computing" Cambridge University Press, 2nd Edition, 1992, 965 Pages.
International Search Report and Written Opinion—PCT/US2016/046576—ISA/EPO—dated Nov. 7, 2016.
Sesmero M.P., et al., "Generating ensembles of heterogeneous classifiers using Stacked Generalization", Wiley Interdisciplinary Reviews: Data Mining and Knowledge Discovery, vol. 5, No. 1, Jan. 28, 2015 (Jan. 28, 2015), pp. 21-34, XP055310680, ISSN: 1942-4787, DOI: 10.1002/widm.1143 the whole document.
Vincent P., et al., "Stacked Denoising Autoencoders: Learning Useful Representations in a Deep Network with a Local Denoising Criterion Pierre-Antoine Manzagol", Journal of Machine Learning Research, Dec. 31, 2010 (Dec. 31, 2010), pp. 3371-3408, XP055209370, Retrieved from the Internet: URL: http://dl.acm.org/citation.cfm?id=1953039 [retrieved on Aug. 25, 2015].

* cited by examiner

METHOD FOR IMPROVING PERFORMANCE OF A TRAINED MACHINE LEARNING MODEL

CROSS-REFERENCE TO RELATED APPLICATION

The present application claims the benefit of U.S. Provisional Patent Application No. 62/209,859, filed on Aug. 25, 2015, and titled "METHOD FOR IMPROVING PERFORMANCE OF A TRAINED MACHINE LEARNING MODEL," the disclosure of which is expressly incorporated by reference herein in its entirety.

BACKGROUND

Field

Certain aspects of the present disclosure generally relate to machine learning and, more particularly, to systems and methods of improving performance of a trained machine learning model.

Background

A machine learning model such as an artificial neural network, which may comprise an interconnected group of artificial neurons (e.g., neuron models), is a computational device or represents a method to be performed by a computational device.

Convolutional neural networks are a type of feed-forward artificial neural network. Convolutional neural networks may include collections of neurons that each have a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back propagation.

Other models are also available for object recognition. For example, support vector machines (SVMs) are learning tools that can be applied for classification. Support vector machines include a separating hyperplane (e.g., decision boundary) that categorizes data. The hyperplane is defined by supervised learning. A desired hyperplane increases the margin of the training data. In other words, the hyperplane should have the greatest minimum distance to the training examples.

Although these solutions achieve excellent results on a number of classification benchmarks, their computational complexity can be prohibitively high. Additionally, training of the models may be challenging.

SUMMARY

In an aspect of the present disclosure, a method for improving performance of a trained machine learning model is presented. The method comprises adding a second classifier with a second objective function to a first classifier with a first objective function. The second objective function is used to directly reduce errors of the first classifier.

In another aspect, an apparatus for improving performance of a trained machine learning model is presented. The apparatus includes a memory and at least one processor coupled to the memory. The processor(s) is configured to add a second classifier with a second objective function to a first classifier with a first objective function. The second objective function is used to directly reduce errors of the first classifier.

In yet another aspect, an apparatus for improving performance of a trained machine learning model is presented. The apparatus includes means for adding a second classifier with a second objective function to a first classifier with a first objective function. The second objective function is used to directly reduce errors of the first classifier. The apparatus further includes means for outputting a feature vector from the second classifier based on an input received via the trained machine learning model.

In yet still another aspect, a non-transitory computer-readable medium is presented. The non-transitory computer-readable medium has encoded thereon program code for improving performance of a trained learning machine model. The program code is executed by a processor and includes program code for adding a second classifier with a second objective function to a first classifier with a first objective function. The second objective function is used to directly reduce errors of the first classifier.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
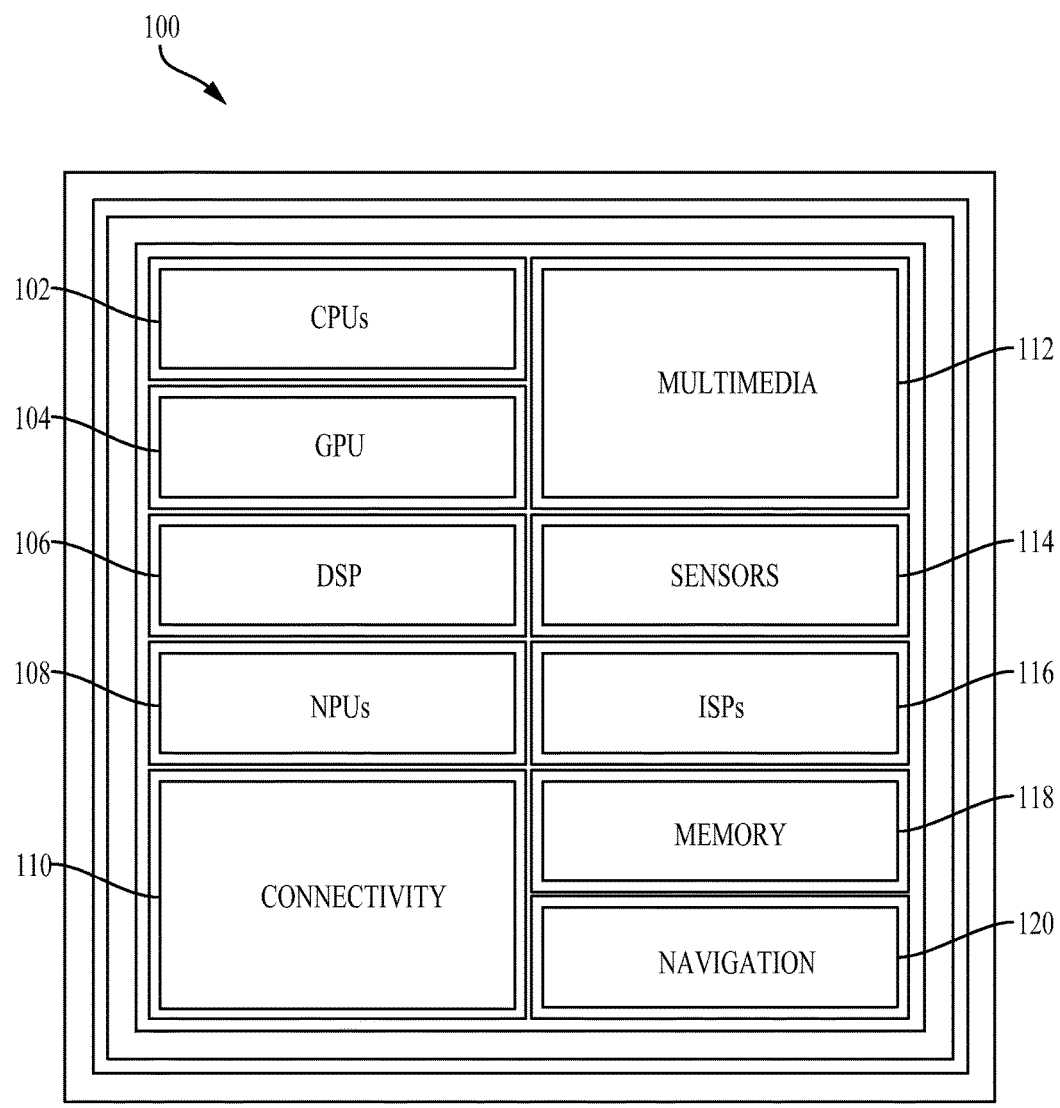
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Aspects of the present disclosure are directed to improving the performance of a trained lower complexity machine learning model. In accordance with aspects of the present disclosure, the model performance may be improved by adding a second classifier configured to directly minimize or reduce the number of classification errors of the low complexity classifier. That is, rather than minimizing a function of errors as given by a typical cost function (e.g., sum of squares (SSE), or negative log likelihood) using standard techniques (e.g., gradient descent), a new objective function for the added classifier is defined to directly minimize or reduce the number of errors. For example, if the classification operations are performed, with seven correct classifications and three incorrect classifications, the objective function may be designed to reduce the three errors to zero.

Additionally, in accordance with aspects of the present disclosure, the performance of the trained lower complexity machine learning model may be further improved using soft probabilities of a higher complexity model.

Soft Probabilities

Soft probabilities are non-maximum probability values or dark values of a probability vector. In many conventional classification systems, a probability vector is used to predict a class label. In such conventional systems, the class label is predicted using the highest or maximum probability value in the probability vector. The non-maximum probability values or soft probabilities are ignored.

For example, consider a supervised machine learning problem of classification, where a machine learning model, $M_\lambda(W)$, is trained using the training data comprised of N samples of the input data $X^{tr}=[x_0, x_1, x_2, \ldots x_{N-1}]$, where $x_i \in \mathbb{R}^D$ and the corresponding N training samples of the C-labeled output data $y^{tr}=[y_0, y_1, y_2, \ldots y_{N-1}]$, where $y_i \in [0, C-1]$. Typically, the parameters $\lambda$ that define the architecture of the machine learning model (e.g., neural network) and the parameters of the learning process to train the model are pre-determined. The training data $\{X^{tr}, y^{tr}\}$ is then used to learn the weights W of the model $M_\lambda$. The training may include encoding the labeled data $y=[y_0, y_1, \ldots y_{N-1}]$ using 1-K encoding to $P=[p_0, p_1, \ldots p_{N-1},]$ such that $p_j \in \mathbb{Z}_2^C$, where $p_{jk}=1$ if $y_j=k$, and $\Sigma_{k=0}^{C-1} p_{jk}=1$.

Given an input x, the machine learning model $M_\lambda$ produces an estimate for the output probability, which may be expressed as:

$$\hat{p}=M_\lambda(x,W) \quad (1)$$

so as to minimize the multi-class cross entropy function given by:

$$C = \sum_{i=0}^{N-1} \sum_{j=0}^{C-1} p_{ij}\log(\hat{p}_{ij}). \quad (2)$$

The output class label is obtained as:

$$\hat{y} = \underset{j}{\operatorname{argmax}}[\hat{p}] \quad (3)$$

As such, only the index of the maximum value of vector $\hat{p}$, referred to as the hard-probability, is utilized for inference and the non-maximum values are ignored.

Aspects of the present disclosure utilize the soft probabilities to improve classification performance. In some aspects, the soft probabilities may be extracted using temperature scaling. For example, the probabilities $\hat{p}$ generated by the neural network model are estimate via the softmax function as follows:

$$\hat{p}_k = \frac{\exp(a_{out,k})}{\sum_{j=0}^{C-1} \exp(a_{out,j})} \quad (4)$$

where $a_{out}=[a_{out,0}, a_{out,1}, \ldots, a_{out,C-1}]$ are the activation values out of the output node of the neural network.

The output probabilities generated by a trained machine learning model (e.g., neural network) may be scaled by temperature T to extract the information hidden in the soft-probabilities as follows:

$$\hat{p}_k^{Te} = \frac{\exp\left(\frac{a_{out,k}}{T}\right)}{\sum_{j=0}^{C-1} \exp\left(\frac{a_{out,j}}{T}\right)} \quad (5)$$

One objective is to soften the distribution of probability vector $\hat{p}$ generated by the trained model. Scaling via temperature T flattens the distribution of probabilities thereby allowing the information in the soft probabilities to be exploited.

Once extracted, the soft probabilities may be used to improve classification performance. For instance, in one example, where $W_m$ and $b_m$ represent the set of weights and the biases used for pooling together the information in soft probabilities, a mixture probability may be given by:

$$\tilde{p}^{Te} = \frac{1}{1 + \exp\left(-\left(W_m \hat{p}^{Te} + b_m\right)\right)} \quad (6)$$

The mixture probabilities may be used to predict the output class label by the trained machine learning model as follows:

$$\tilde{y} = \underset{j}{\operatorname{argmax}}[\tilde{p}^{Te}] \quad (7)$$

The training data $\{X^{tr}, y^{tr}\}$ may be used to estimate the values for the weights and biases used to generate the mixture of soft probabilities. The fractional training error generated by the trained machine learning model when the output labels are predicted using only hard probabilities $e_d$ (Eq. 3) and the fractional training error when the output labels are predicted using the soft probabilities (e) (Eq. 7) are given by:

$$e_d = \frac{1}{N} \sum_{j=0}^{N-1} \Pi_{\tilde{y}_j \neq \hat{y}_j} \quad (8)$$

$$e = \frac{1}{N} \sum_{j=0}^{N-1} \Pi_{\tilde{y}_j \neq \hat{y}_j} \quad (9)$$

A cost function C may be used to reduce the classification errors. That is, the cost function C may be designed such that the error on the training data when using the predicted values for the output labels generated by the mixture of soft-probabilities is lower than the error obtained by using the probabilities the cost function takes on a positive non-zero value. The cost function may be expressed as:

$$C = \max(0, (e_d - e)/e_d) \quad (10)$$

An improved or optimal weight and biases for the mixture of soft probabilities may be obtained by solving the following optimization problem:

$$\{W_m^*, b_m^*\} = \underset{\{W_M, b_m\}}{\operatorname{argmin}}[1 - C] \quad (11)$$

The optimization problem of Equation 11 may be solved using any of the standard unconstrained optimization processes that do not use gradient values with initial conditions $\{W_m(0), b_m(0)\} = \{1, 0\}$. In some aspects, optimization techniques may also be employed to determine an improved or optimal temperature for generating the soft probabilities. For example, the optimization problem of Equation 11 may be modified as follows:

$$\{T^*, W_m^* b_m^*\} = \underset{\{T, W_M, b_m\}}{\operatorname{argmin}}[1 - C] \quad (12)$$

Using a standard unconstrained minimization process results in a solution, which is a local minima for C around the initial choice of the temperature. A convergence strategy may be used to get out of the local minima around the initial choice of temperature. For instance, in some aspects, the strategy may begin with an initial set of parameters: $\{T(0), W_m(0), b_m(0)\}$ and solve for optimal values for the weights and biases $\{W^{*'}_m{}^{T(0)}, b^{*'}_m{}^{T(0)}\}$ using Equation 11. Starting from the initial condition $T'(0)$, optimize the cost function: $C = \max(0, (e-e')/e)$, where e is computed using Equation 11 with $\{T'(0), W^{*'}_m{}^{T(0)}, b^{*'}_m{}^{T(0)}\}$ and e' is computed using Equation 11 with $\{T'(0), W^{*'}_m{}^{T(0)}, b^{*'}_m{}^{T(0)}\}$. The sequence may be repeated until convergence.

In some aspects, ensemble averaging may be implemented across machine learning models and/or across multiple logistic regression layers in a single machine learning model. In one example, multiple machine learning models (M>1) are trained using the training data with output probabilities $\{\hat{p}_0, \hat{p}_1, \ldots \hat{p}_{M-1}\}$ generated by the M trained models. For each of these models, an optimal mixture of soft probabilities may be generated using the procedure optimization techniques and/or convergence strategy above. The resulting mixture probabilities $\{\tilde{p}_0^{Te_0}, \tilde{p}_1^{Te_1}, \ldots \tilde{p}_{M-1}^{Te_{M-1}}\}$ may be used to predict the output label as:

$$y^{pred} = \underset{j}{\operatorname{argmax}}\left[\sum_k w_k \tilde{p}_k^{Te_k}\right] \quad (13)$$

One choice for $\{w_k\}$ is $w_k = 1/M$, for $k = (1, 2, \ldots M-1)$. Alternatively, the optimization technique and convergence strategy above or other similar techniques may be used to estimate the optimal set of the multi-model probability mixture weights $\{w_k\}$.

In another example, in a single machine learning model but with multiple logistic regression output layers, the optimization techniques, the convergence strategy and the like may be use to improve or optimize the soft probabilities resulting from the different logistic regression layers of the model.

In some aspects, inferences may be improved using soft probabilities when the number of classes is large (e.g., C>>1). The number of parameters to generate an optimal mixture of soft probabilities scale as $C^2$ and can be a problem when estimating the mixture of soft probabilities for inference. In this case, a subset P<<C of the highest soft probabilities for each class believed to contain useful information may be leveraged to improve the classification performance. In turn, Equation 11 may be solved to obtain the weights and biases such that the total number of parameters to be estimated are P(P+1). At or about the inference time, the index of the top P soft probabilities may be tracked and appended via the estimated mixture probabilities using the optimal weights and biases.

FIG. 1 illustrates an example implementation of the aforementioned method of improving performance of a trained machine learning model using a system-on-a-chip (SOC) 100, which may include a general-purpose processor (CPU) or multi-core general-purpose processors (CPUs) 102 in accordance with certain aspects of the present disclosure. Variables (e.g., model weights), system parameters associated with a computational device (e.g., machine learning model with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs), and/or navigation 120, which may include a global positioning system.

The SOC 100 may be based on an ARM instruction set. In an aspect of the present disclosure, the instructions loaded into the general-purpose processor 102 may comprise code for adding a second classifier with a second objective function (e.g., cost) to a first classifier with a first objective function (e.g., cost). The second objective function is used to directly reduce errors of the first classifier.

Figure 2:
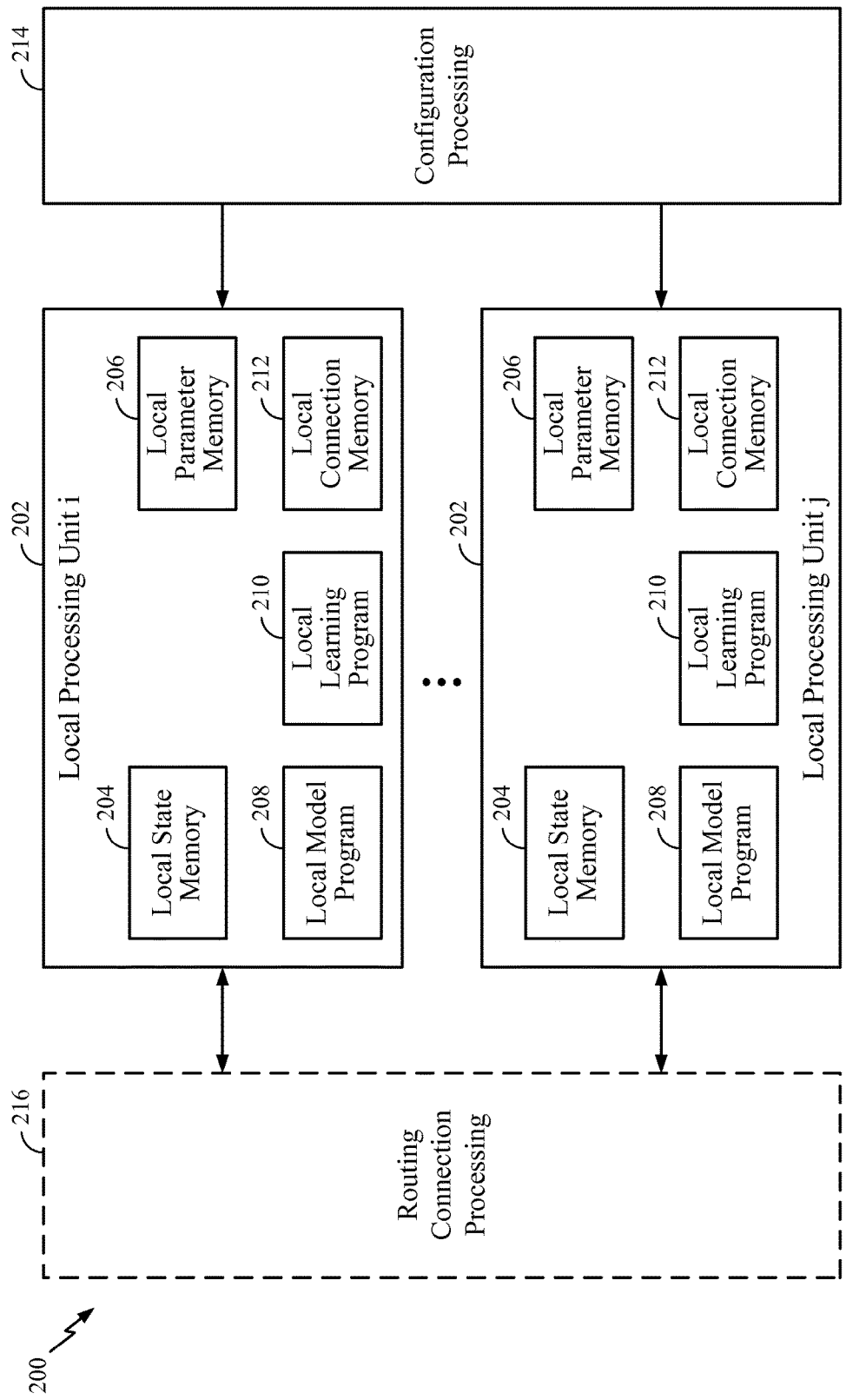
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Machine learning models such as neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
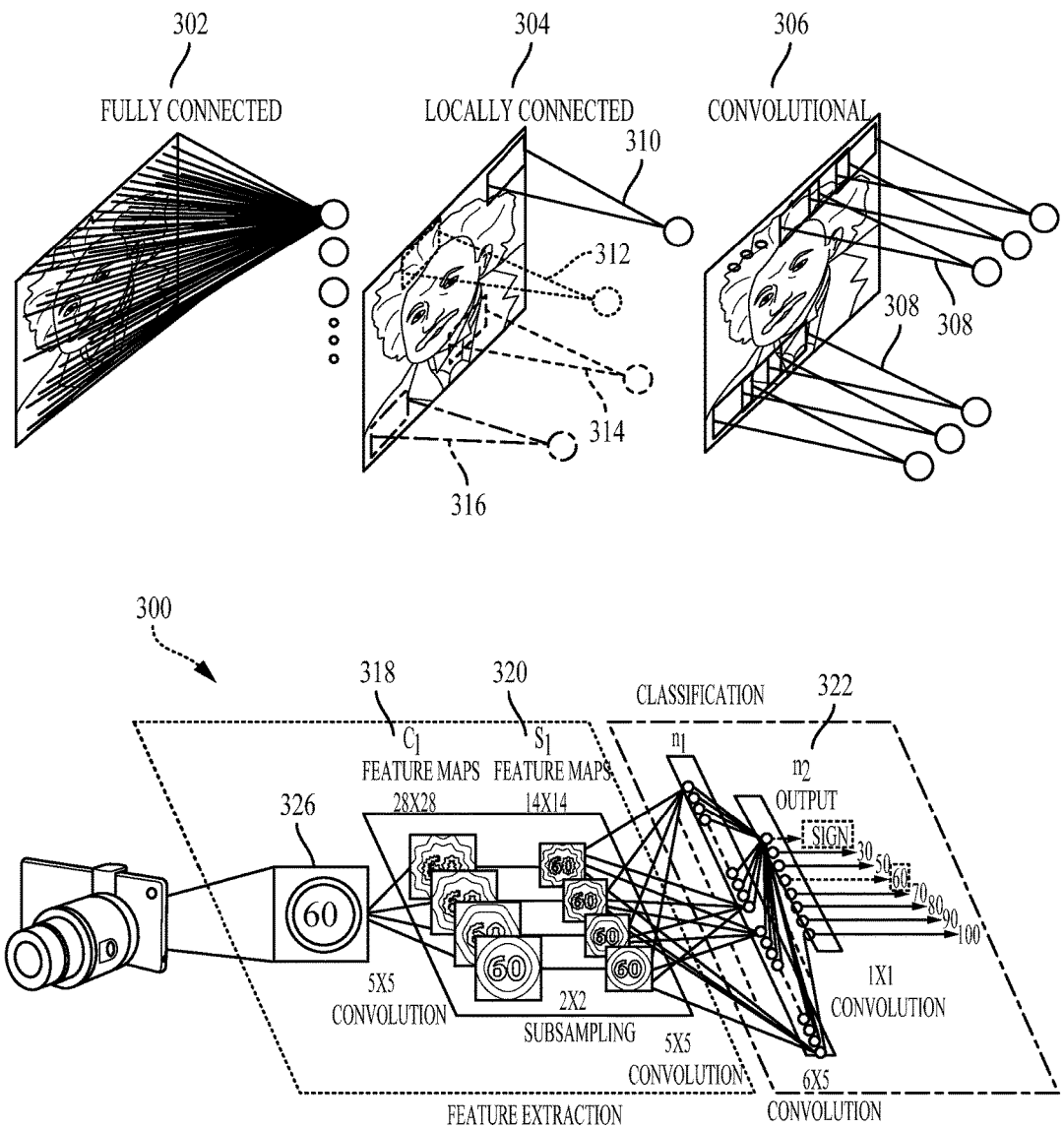
FIG. 3A is a diagram illustrating a neural network in accordance with aspects of the present disclosure.

Referring to FIG. 3A, the connections between layers of a neural network may be fully connected 302 or locally connected 304. In a fully connected network 302, a neuron in a first layer may communicate its output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A DCN may be trained with supervised learning. During training, a DCN may be presented with an image, such as a cropped image of a speed limit sign 326, and a "forward pass" may then be computed to produce an output 322. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, $\max(0,x)$. Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3B:
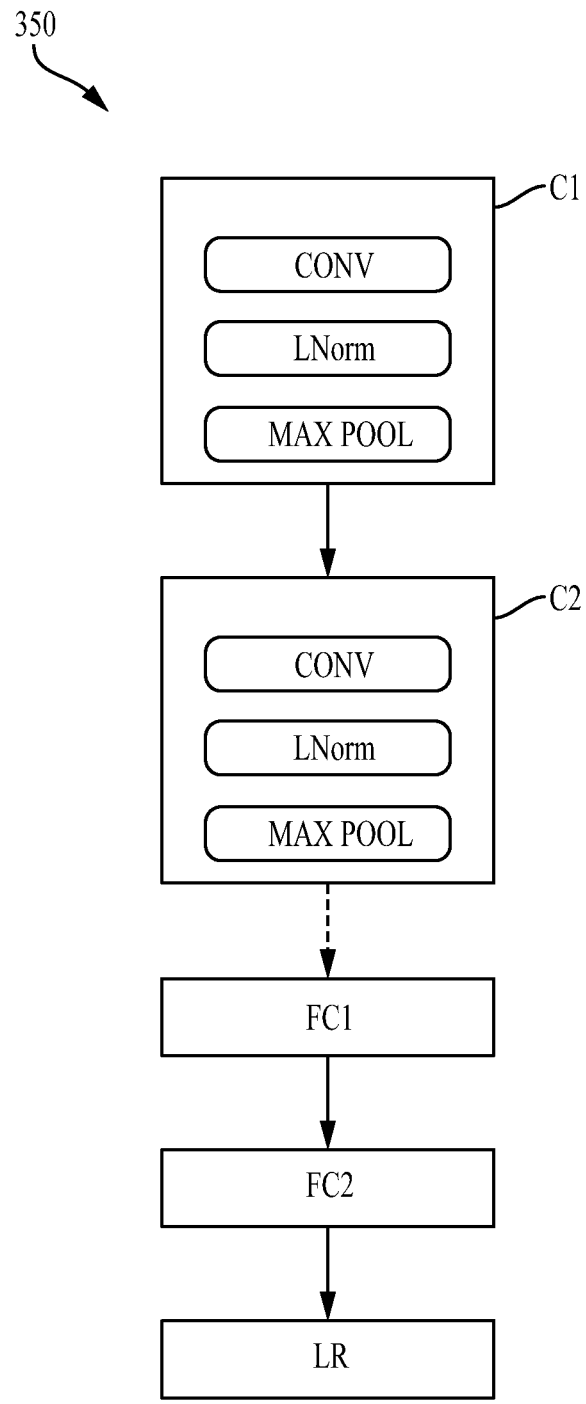
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Figure 4:
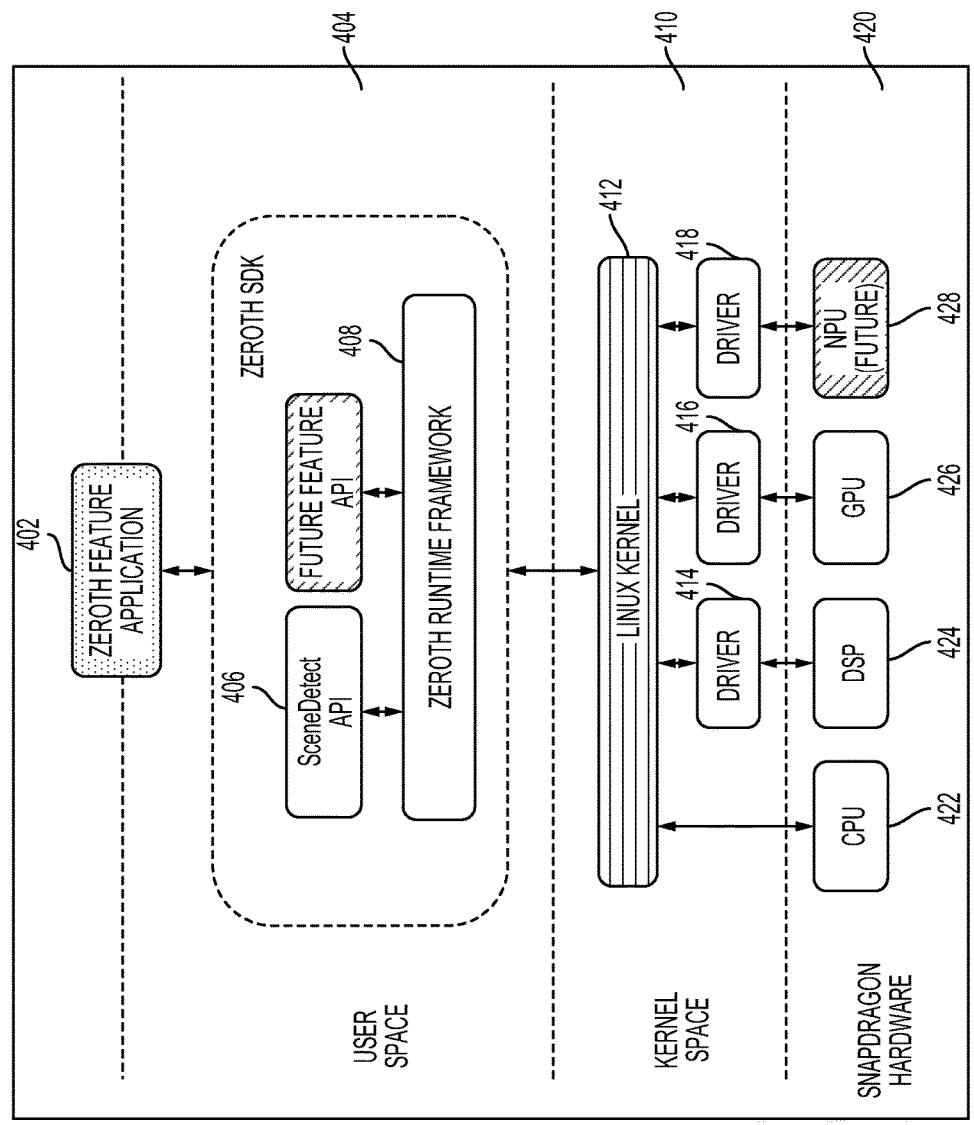
FIG. 4 is a block diagram illustrating an exemplary software architecture that may modularize artificial intelligence (AI) functions in accordance with aspects of the present disclosure.

FIG. 4 is a block diagram illustrating an exemplary software architecture 400 that may modularize artificial intelligence (AI) functions. Using the architecture, applications 402 may be designed that may cause various processing blocks of an SOC 420 (for example a CPU 422, a DSP 424, a GPU 426 and/or an NPU 428) to perform supporting computations during run-time operation of the application 402.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in a SceneDetect application programming interface (API) 406 to provide an estimate of the current scene. This request may ultimately rely on the output of a deep neural network configured to provide scene estimates based on video and positioning data, for example.

A run-time engine 408, which may be compiled code of a Runtime Framework, may be further accessible to the AI application 402. The AI application 402 may cause the run-time engine, for example, to request a scene estimate at a particular time interval or triggered by an event detected by the user interface of the application. When caused to estimate the scene, the run-time engine may in turn send a signal to an operating system 410, such as a Linux Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the deep neural network may be configured to run on a combination of processing blocks, such as a CPU 422 and a GPU 426, or may be run on an NPU 428, if present.

Figure 5:
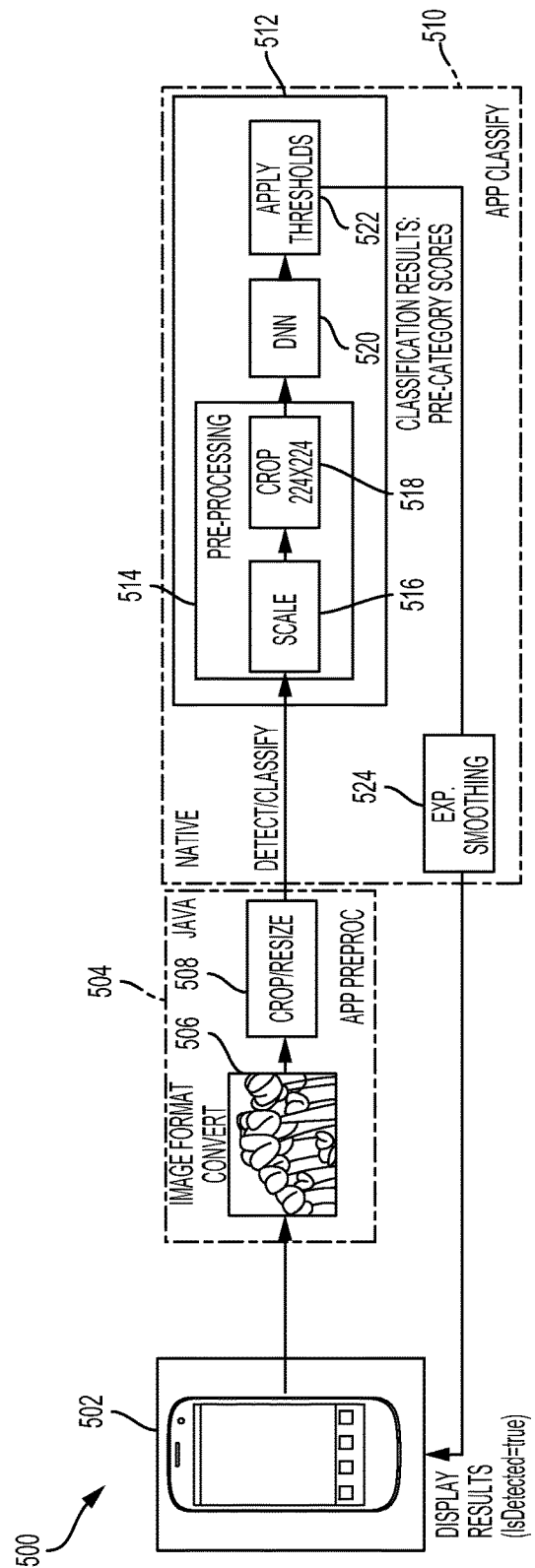
FIG. 5 is a block diagram illustrating the run-time operation of an AI application on a smartphone in accordance with aspects of the present disclosure.

FIG. 5 is a block diagram illustrating the run-time operation 500 of an AI application on a smartphone 502. The AI application may include a pre-process module 504 that may be configured (using for example, the JAVA programming language) to convert the format of an image 506 and then crop and/or resize the image 508. The pre-processed image may then be communicated to a classify application 510 that contains a SceneDetect Backend Engine 512 that may be configured (using for example, the C programming language) to detect and classify scenes based on visual input. The SceneDetect Backend Engine 512 may be configured to further preprocess 514 the image by scaling 516 and cropping 518. For example, the image may be scaled and cropped so that the resulting image is 224 pixels by 224 pixels. These dimensions may map to the input dimensions of a neural network. The neural network may be configured by a deep neural network block 520 to cause various processing blocks of the SOC 100 to further process the image pixels with a deep neural network. The results of the deep neural network may then be thresholded 522 and passed through an exponential smoothing block 524 in the classify application 510. The smoothed results may then cause a change of the settings and/or the display of the smartphone 502.

In one configuration, a machine learning model is configured for adding a second classifier with a second objective (e.g., cost) function to a first classifier with a first objective (e.g., cost) function, the second objective function being used to directly reduce errors of the first classifier. The machine learning model is also configured for outputting a feature vector from the second classifier based on an input received via the trained machine learning model. The machine learning model includes an adding means and/or outputting means. In one aspect, the adding means and/or outputting means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the network based upon desired one or more functional features of the network, and develop the one or more functional features towards the desired functional features as the determined parameters are further adapted, tuned and updated.

Figure 6A:
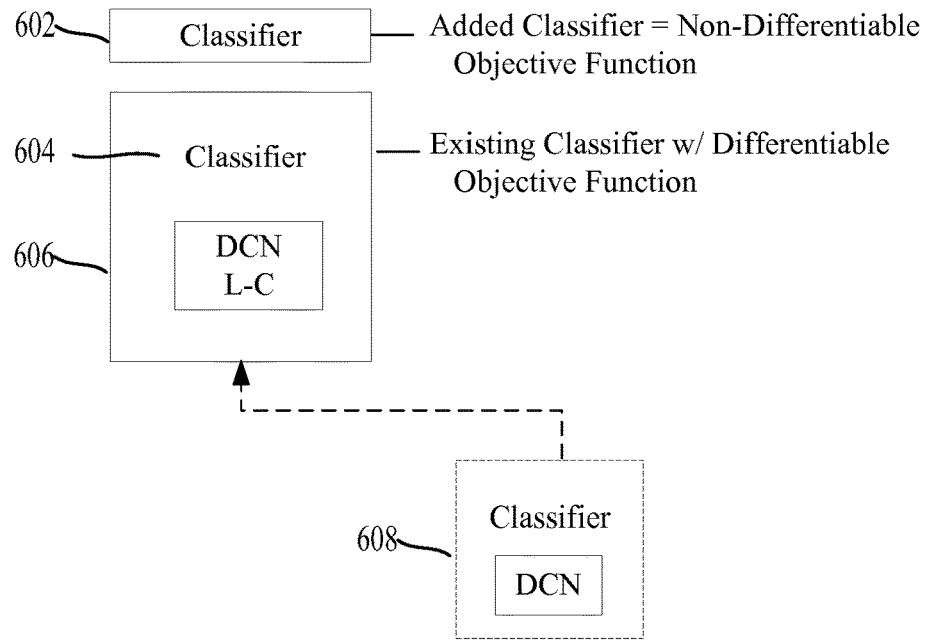
FIGS. 6A and 6B are block diagrams illustrating variations for adding a second classifier to a first classifier to improve the performance of a machine learning model in accordance with aspects of the present disclosure.
Figure 6B:
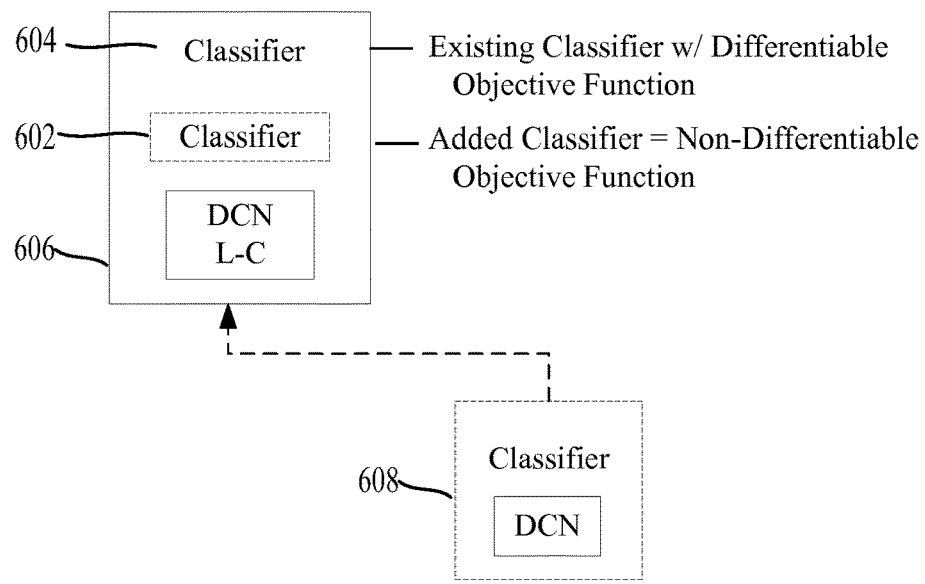

FIGS. 6A and 6B are block diagrams illustrating variations for adding a second classifier to a first classifier to improve the performance of a machine learning model such as a neural network model. Referring to FIGS. 6A and 6B, a second classifier 602 may be added to a first classifier 604 of a trained machine learning model 606. In some aspects, the machine learning model 606 may comprise a deep convolutional network (DCN) including a locally connected (L-C) layer or another machine learning model. The machine learning model may be low in complexity. In some exemplary aspects, a machine learning model that has less than 1 billion multiply-accumulate operations (MACs) may be considered a low complexity model. On the other hand, a machine learning model that has greater than 1 billion multiply-accumulate operations may be considered a high complexity model. Of course, other metrics may also be used to determine the relative complexity of the models (e.g., number of parameters, number of stages (layers) and/or type of stages).

The trained machine learning model 606 may be configured to receive an input (e.g., an image) (not shown). The machine learning model 606 may process the image to extract a set of feature from the input. A feature vector corresponding to the input may be supplied to the first classifier 604. The first classifier 604 may be configured with a differentiable (e.g., a gradient is determinable) objective function, which may be used to improve the classification accuracy. In turn, the first classifier 604 may generate a probability vector $P_c$ that may be used to determine an output class label.

To improve performance and accuracy of the first classifier 604, the second classifier 602 may be added. The second classifier 602 may be configured with a non-differentiable (e.g., there is no gradient) objective function. The objective function may be configured to directly reduce the number of errors produced by the first classifier 604. That is, rather than attempting to minimize a cost function or function of errors for the first classifier 604, the second classifier 602 reduces the total number of errors. For example, in some aspects, the objective function for the second classifier 602 may be expressed as:

$$\text{Objective function: argmax } [\max(0,(e_d-e)))] \quad (14)$$

The objective function may be used to determine weights and bias terms for the second classifier 602 using unconstrained minimization techniques as described above. Accordingly, the output class labels from the second classifier 602 may include fewer errors than produced via the second classifier 602 alone.

This configuration may be particularly beneficial because the improvement in the classification performance may be achieved without retraining the previously trained machine learning model. Instead, performance may be improved by only retraining the second classifier 602.

In some aspects, as shown in FIG. 6B, the second classifier 602 may alternatively be provided within a trained machine learning model 606 (e.g., as a layer of the model from the trained machine learning model.) Furthermore, in some aspects, the performance of the machine learning model 606 (shown in FIGS. 6A and 6B) may be further improved using soft probabilities supplied via a high complexity model 608.

Figure 7:
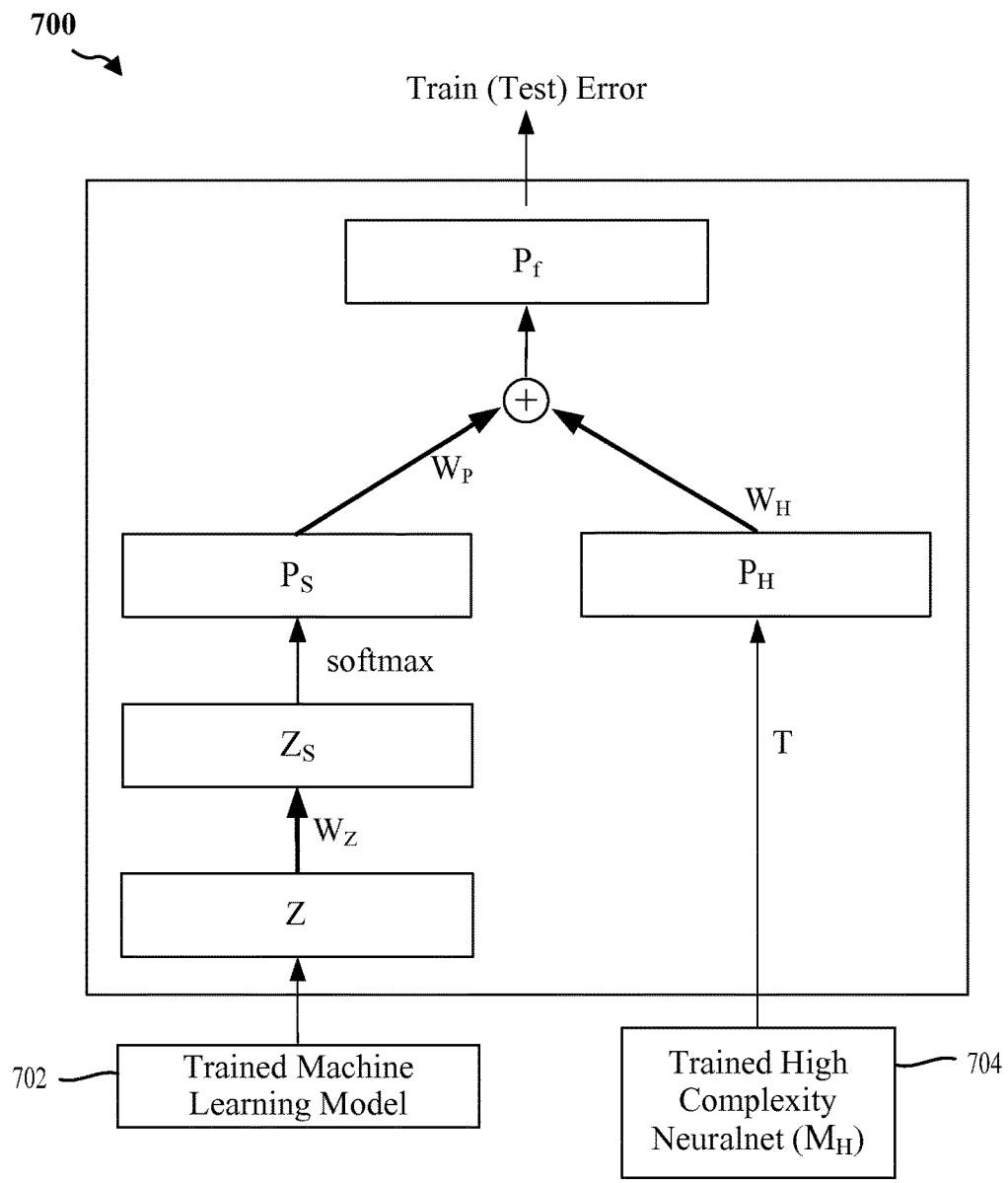
FIG. 7 is a schematic diagram of an exemplary classifier to improve the performance of a trained machine learning model in accordance with aspects of the present disclosure.

FIG. 7 presents a schematic diagram of an exemplary classifier 700 to improve the performance of a trained machine learning model (e.g., a neural network) in accordance with aspects of the present disclosure. Referring to FIG. 7, a non-differentiable objective function, O, is added at the output of the classifier (regression) layer of the neural network. The objective function may be specified such that the maximum non-zero value for the objective function for a given training (or testing) dataset will only occur when the number of training (testing) errors are below those obtained for the original trained neural network.

Given an input $X \in \mathbb{R}^D$, a machine learning model 702 may be configured to classify the input into one of C classes. Using an encoding scheme, such as one-hot encoding, the class labels may be denoted by a probability vector, $P \in \mathbb{Z}_2^C$, such that for a given class label $l < C$, $P = [p_1 p_2 \ldots p_C]^T$, where $p_j = 1$ if $i = 1$ and $\Sigma_{i=2}^C p_i = 1$. Given a trained machine learning model (e.g., neural network) M: $X \in \mathbb{R}^D \rightarrow Z \in \mathbb{R}^C$, an estimated probability vector $\hat{P}$ may be obtained from Z as: $\hat{P} = \sigma(Z)$, where $\sigma$ is the soft-max nonlinearity.

As discussed above, traditional approaches use $\hat{P}$ to predict the class label as $\hat{l} = \text{argmax } [\hat{P}]$. For a given dataset with U training samples, the training error is then obtained as:

$$e_d^{tr} = \frac{1}{U} \sum_{i=1}^{U} \Pi_{l \neq l'},$$

and the testing error on V test samples is similarly obtained as:

$$e_d^{ts} = \frac{1}{V} \sum_{i=1}^{V} \Pi_{l \neq l'}.$$

The values for $e_d^{tr}$ and $e_d^{ts}$ determine the goodness or accuracy of the model M. One goodness or accuracy metric for a trained model M is, $e_d^{tr} = 0$ and $e_d^{ts} \ll 1$. Aspects of the present disclosure aim to improve performance of a trained model M for which $e_d^{tr} \neq 0$.

In accordance with aspects of the present disclosure, a feature representation generated via a trained model 702 may be supplied to a classifier 700. The classifier 700 receives feature vector Z, which may be mixed with model weight $W_z$ to produce a new feature vector $Z_s = W_z^T Z$. The feature vector $Z_s$ may then be used to estimate the probability vector $P_s = \sigma(Z_s)$. A probability feature vector $P_f = W_p^T P_s$ may then be used to compute an estimated prediction error on the training set as:

$$e^{tr} = \frac{1}{U} \sum_{i=1}^{U} \Pi_{f \neq l'},$$

where $\hat{l}_f = \text{argmax } [P_f]$. The parameters, $\lambda = [W_z, W_p]$, are estimated by optimizing over the following objective function:

$$O = \text{MAX}(0,(e_d^{tr} - e^{tr})) \quad (14)$$

In some aspects, a high complexity model 704 may provide a soft probability vector $P_H$ to the machine learning model 702. The soft-probability vector may be mixed with model weight $W_h$. In turn, the probability-feature vector $P_f = W_p^T P_s + W_h^T P_H$ may be used to compute the estimated prediction error on the training set as:

$$e^{tr} = \frac{1}{U} \sum_{i=1}^{U} \Pi_{f \neq l'},$$

where $\hat{l}_f$=argmax $[P_f]$. The parameters, $\lambda=[W_z, W_p, W_h, T]$, may be estimated by optimizing over the objective function of Equation 14.

Given that O is a non-differentiable function, an unconstrained minimization process may be used to solve for optimal $\lambda^*$ as: $\lambda^*$=argmax $[O]$. A non-zero convergence value for O would imply that $e_d^{tr} < e^{tr}$, thus producing a resulting model with better performance than the original model at the cost of estimating an additional set of parameters.

In some aspects, some of the parameters in $\lambda$ (e.g., $W_z$, $W_p$, $W_h$, or T) may be set a priori. As such, issues of overfitting due to the addition of several of the new parameters may be mitigated or reduced.

In some aspects, various simplifications may be employed while improving performance according to design preference. For example, weights corresponding to features produced by the trained learning model may be set to an identity value. As such, a mixture of feature vectors generated by the trained machine learning model will not be considered. On the other hand, in a second example, only a mixture of feature vectors produced via the trained machine learning model may be considered.

In a third example, weights corresponding to features produced by the trained learning model may be set to an identity value and soft-probability information available from the high complexity model 704 may be ignored.

In a fourth example, soft-probabilities $P_H$ from the high complexity model 704 may be rescaled by a given temperature value (e.g., T=$\alpha$, $\alpha$>1).

Figure 8:
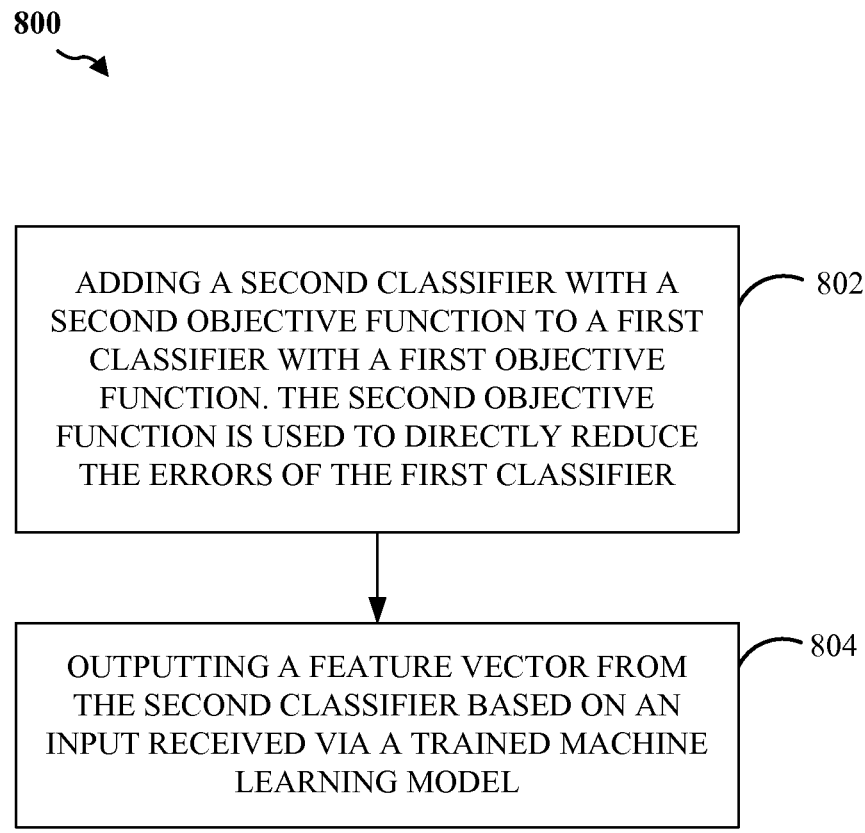
FIG. 8 illustrates a method for improving performance of a trained machine learning model in accordance with aspects of the present disclosure.

FIG. 8 illustrates a method 800 for improving performance of a trained machine learning model. In block 802, the process adds a second classifier with a second objective function (e.g., cost) to a first classifier with a first objective function (e.g., cost). The second objective function is used to directly reduce errors of the first classifier.

The first objective function is differentiable and the second objective function is non-differentiable. In some aspects, the second objective function may be a function of a difference between errors of the first classifier and the second classifier. In other aspects, the second objective function may be determined based on a mixture of probabilities from a higher complexity model.

In some aspects, the second classifier may be added externally to the first classifier. Alternatively, the second classifier may be incorporated within the first classifier (e.g., a layer of the first classifier). Furthermore, the second classifier may be added without retraining the first classifier.

In block 804, the process outputs a feature vector from the second classifier based on an input received via the trained machine learning model.

In some aspects, the process may implement various simplifications to reduce or mitigate overfitting issues. For example, the process may assign weights to features produced by a model, which is trained by the first classifier, to an identity value. The process may also assign weights to features produced by a probability vector of a high complexity model to zero. The process may further assign weights to features produced by a probability vector of the second classifier. The process may assign weights to features produced by a probability vector of a high complexity model to zero. The process may further assign weights to features produced by a probability vector of the second classifier. The process may also scale probability vectors generated by a higher complexity model by a fixed temperature T.

Figure 9:
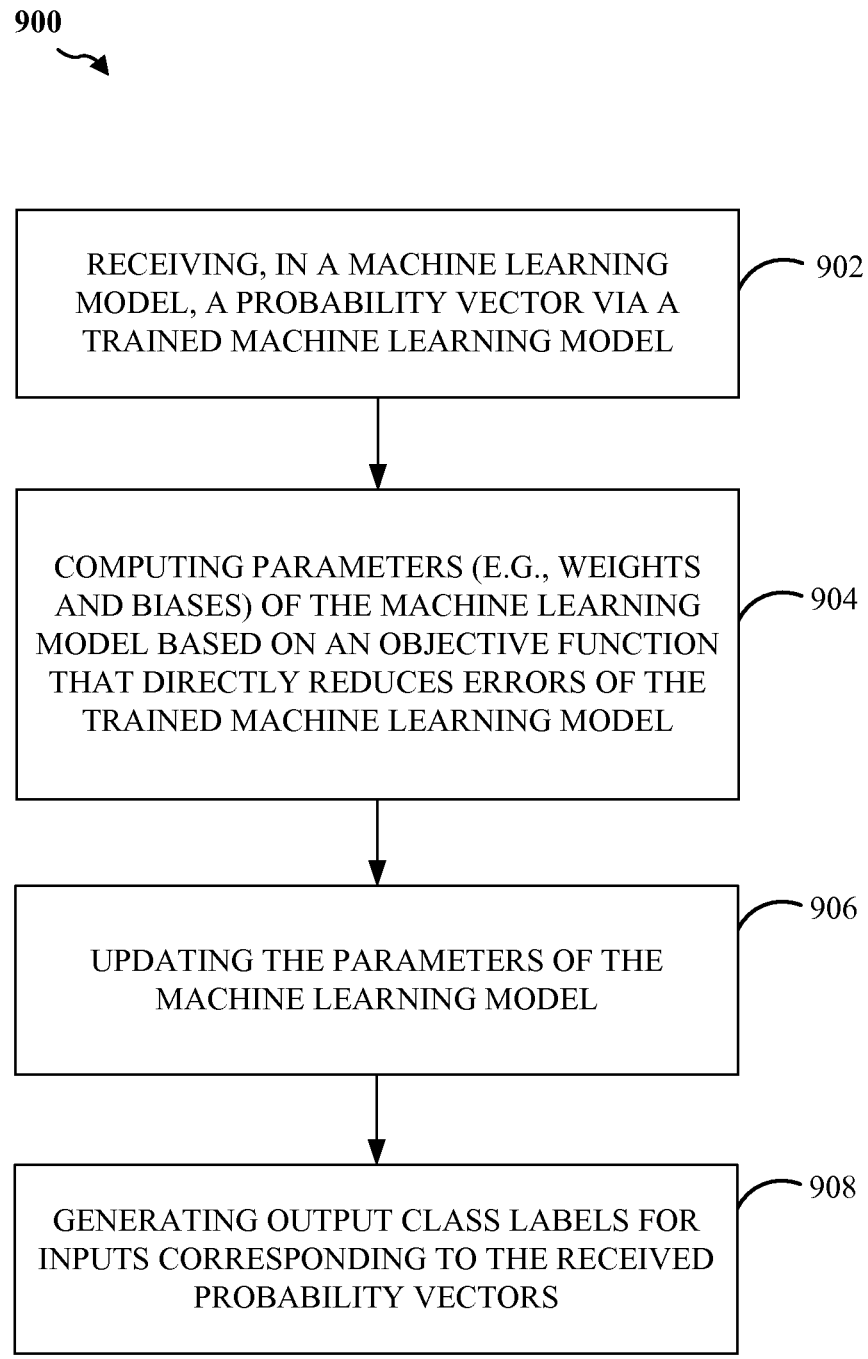
FIG. 9 is a block diagram illustrating a method for improving performance of a trained machine learning model in accordance with aspects of the present disclosure.

FIG. 9 is a block diagram illustrating a method 900 for improving performance of a trained machine learning model in accordance with aspects of the present disclosure. In block 902, the process receives in a machine learning model (e.g., classifier) a machine probability vectors via a trained machine learning model. The probability vectors correspond to inputs received in the trained machine learning model. In block 904, parameters of the machine learning model, such as the model weights and biases, may be computed based on an objective function that directly reduces the errors of the trained machine learning model. That is, the objective function is designed to directly reduce the number of errors rather than the function of errors for the trained machine learning model. As such, the objective function of the machine learning model is non-differentiable.

In some aspects, soft probabilities from the trained machine learning model and/or a high complexity model may be used to compute the parameters.

In block 906, the process may update the parameters of the machine learning model. Thereafter, the machine learning model may generate output class labels for the inputs corresponding to the received probability vectors, in block 908. As such, the classification errors following the updating may be less than those produced by the trained machine learning model for the same inputs. Accordingly, the performance of the trained machine learning model may be improved.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A computer-implemented method for improving performance of a trained machine learning model, comprising:
   receiving, at a second classifier with a second objective function, a first classification output from a first classifier with a first objective function, the first classification output generated by classifying an object identified in an input received at the first classifier; and
   classifying, at the second classifier, the object according to features generated by convolving the first classification output with weights of the second classifier, the second classifier directly reducing a number of classification errors of the first classification output.

2. The computer-implemented method of claim 1, in which the first objective function is differentiable.

3. The computer-implemented method of claim 1, in which the second objective function is non-differentiable.

4. The computer-implemented method of claim 1, in which the second objective function is a function of a difference between errors of the first classifier and the second classifier.

5. The computer-implemented method of claim 1, further comprising determining the second objective function based at least in part on a mixture of probabilities from a higher complexity model.

6. The computer-implemented method of claim 1, further comprising adding the second classifier without retraining the first classifier.

7. The computer-implemented method of claim 1, further comprising adding the second classifier externally to the first classifier.

8. The computer-implemented method of claim 1, further comprising assigning weights to features produced by a model, which is trained by the first classifier, to an identity value.

9. The computer-implemented method of claim 8, further comprising assigning weights to features produced by a probability vector of a high complexity model to zero.

10. The computer-implemented method of claim 1, further comprising assigning weights to features produced by a probability vector of the second classifier.

11. The computer-implemented method of claim 1, further comprising assigning weights to features produced by a probability vector of a high complexity model to zero.

12. The computer-implemented method of claim 11, further comprising assigning weights to features produced by a probability vector of the second classifier.

13. The computer-implemented method of claim 1, farther comprising scaling probability vectors generated by a higher complexity model by a fixed temperature T.

14. An apparatus for improving performance of a trained machine learning model, comprising:
   a memory; and
   at least one processor coupled to the memory, the at least one processor configured:
      to receive, at a second classifier with a second objective function, a first classification output from a first classifier with a first objective function, the first classification output generated by classifying an object identified in an input received at the first classifier; and
   to classify, at the second classifier, the object according to features generated by convolving the first classification output with weights of the second classifier, the second classifier directly reducing a number of classification errors of the first classification output.

15. The apparatus of claim 14, in which the first objective function is differentiable.

16. The apparatus of claim 14, in which the second objective function is non-differentiable.

17. The apparatus of claim 14, in which the second objective function is a function of a difference between errors of the first classifier and the second classifier.

18. The apparatus of claim 14, in which the at least one processor is further configured to determine the second objective function based at least in part on a mixture of probabilities from a higher complexity model.

19. The apparatus of claim 14, in which the at least one processor is further configured to add the second classifier without retraining the first classifier.

20. The apparatus of claim 14, in which the at least one processor is further configured to add the second classifier externally to the first classifier.

21. The apparatus of claim 14, in which the at least one processor is further configured to assign weights to features produced by a model, which is trained by the first classifier, to an identity value.

22. The apparatus of claim 21, in which the at least one processor is further configured to assign weights to features produced by a probability vector of a high complexity model to zero.

23. The apparatus of claim 14, in which the at least one processor is further configured to assign weights to features produced by a probability vector of the second classifier.

24. The apparatus of claim 14, in which the at least one processor is further configured to assign weights to features produced by a probability vector of a high complexity model to zero.

25. The apparatus of claim 24, in which the at least one processor is further configured to assign weights to features produced by a probability vector of the second classifier.

26. The apparatus of claim 14, in which the at least one processor is further configured to scale probability vectors generated by a higher complexity model by a fixed temperature T.

27. An apparatus for improving performance of a trained machine learning model, comprising:

means for receiving, at a second classifier with a second objective function, a first classification output from a first classifier with a first objective function, the first classification output generated by classifying an object identified in an input received at the first classifier; and means for classifying, at the second classifier, the object according to features generated by convolving the first classification output with weights of the second classifier, the second classifier directly reducing a number of classification errors of the first classification output.

28. A non-transitory computer-readable medium having encoded thereon program code for improving performance of a trained machine learning model, the program code being executed by a processor and comprising:

program code to receive, at a second classifier with a second objective functions, a first classification output from a first classifier with a first objective function, the first classification output generated by classifying an object identified in an input received at the first classifier; and program code to classify, at the second classifier, the object according to features generated by convolving the first classification output with weights of the second classifier, the second classifier directly reducing a number of classification errors of the first classification output.

* * * * *